H. H. NIGHTINGALE & P. B. JANTZ.
BAND CUTTER AND FEEDER.
APPLICATION FILED MAY 8, 1913. RENEWED MAR. 13, 1916.
1,181,609.
Patented May 2, 1916.
3 SHEETS—SHEET 2.
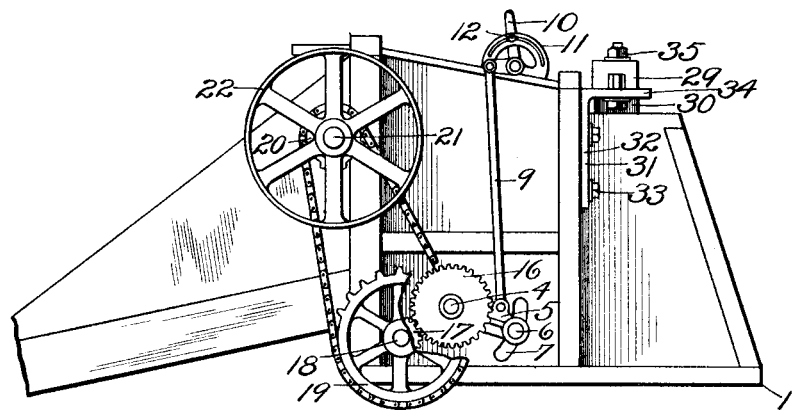
Fig. II.
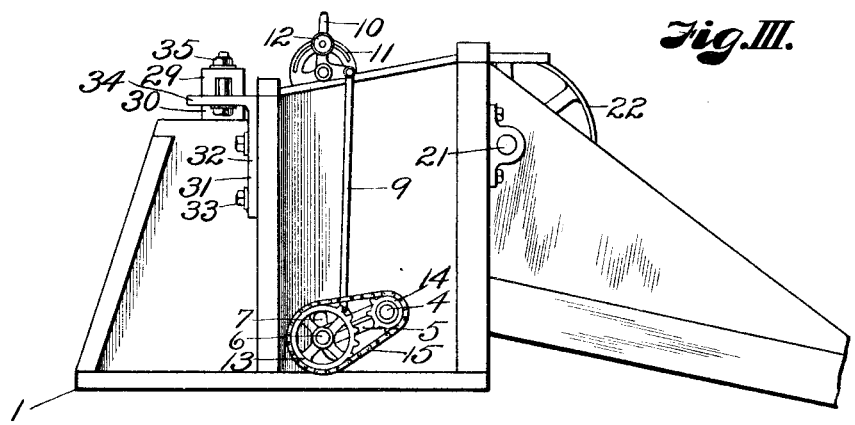
Fig. III.
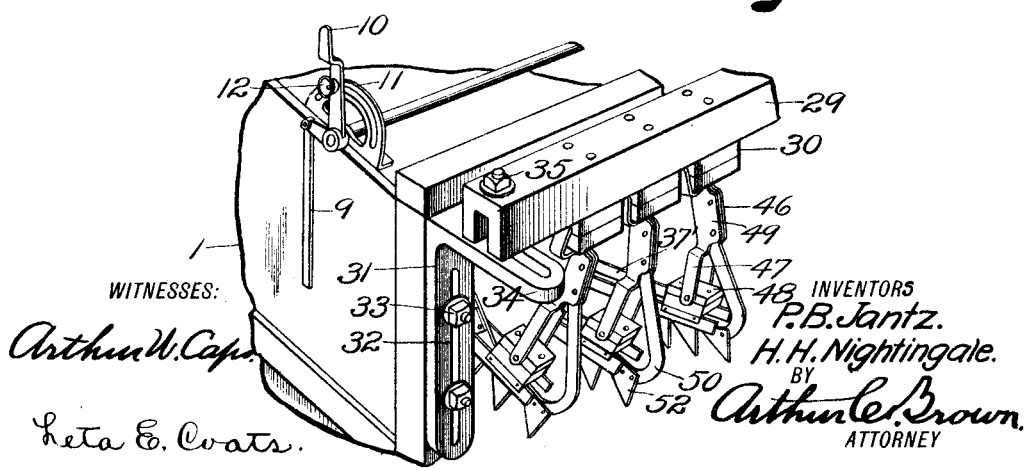
Fig. IV.
WITNESSES:
Arthur W. Capps
Leta E. Coats.
INVENTORS
P. B. Jantz.
H. H. Nightingale.
BY Arthur C. Brown
ATTORNEY H. H. NIGHTINGALE & P. B. JANTZ.
BAND CUTTER AND FEEDER.
APPLICATION FILED MAY 8, 1913. RENEWED MAR. 13, 1916.
1,181,609.
Patented May 2, 1916.
3 SHEETS—SHEET 3.
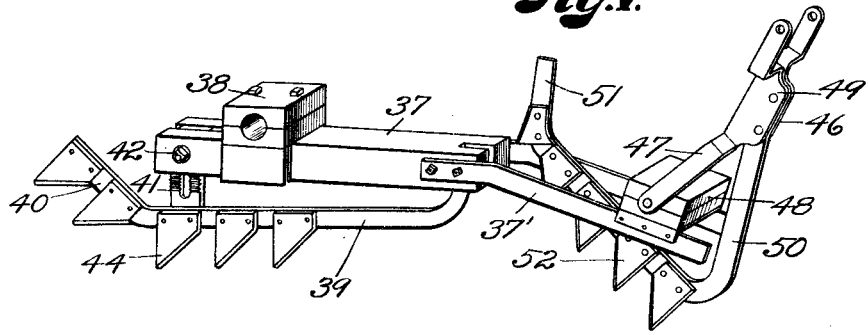
*Fig. V.*
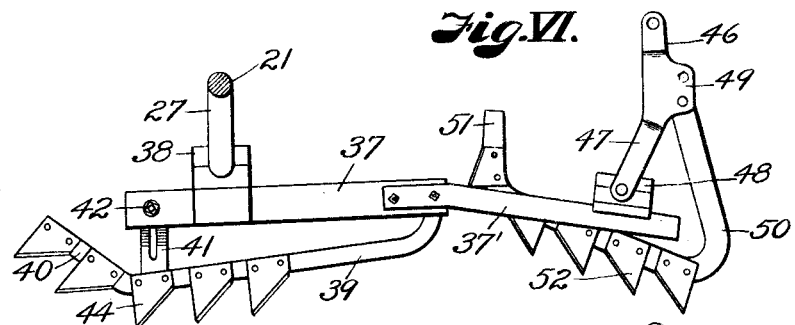
*Fig. VI.*
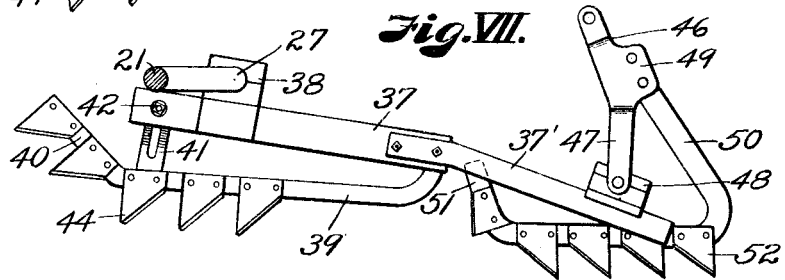
*Fig. VII.*
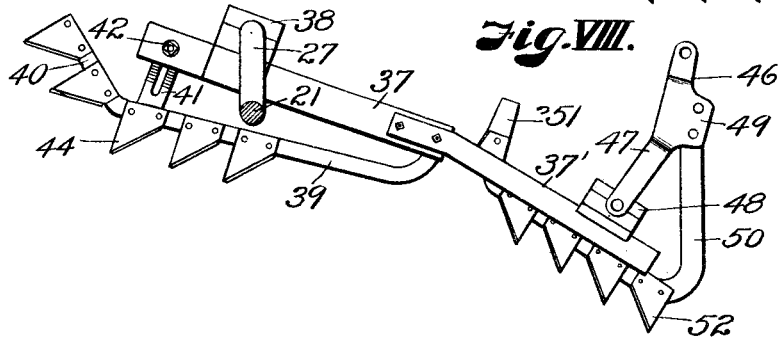
*Fig. VIII.*
WITNESSES:
Arthur W. Caps.
Leta E. Coats.
INVENTOR
P. B. Jantz.
H. H. Nightingale.
BY Arthur C. Brown.
ATTORNEY

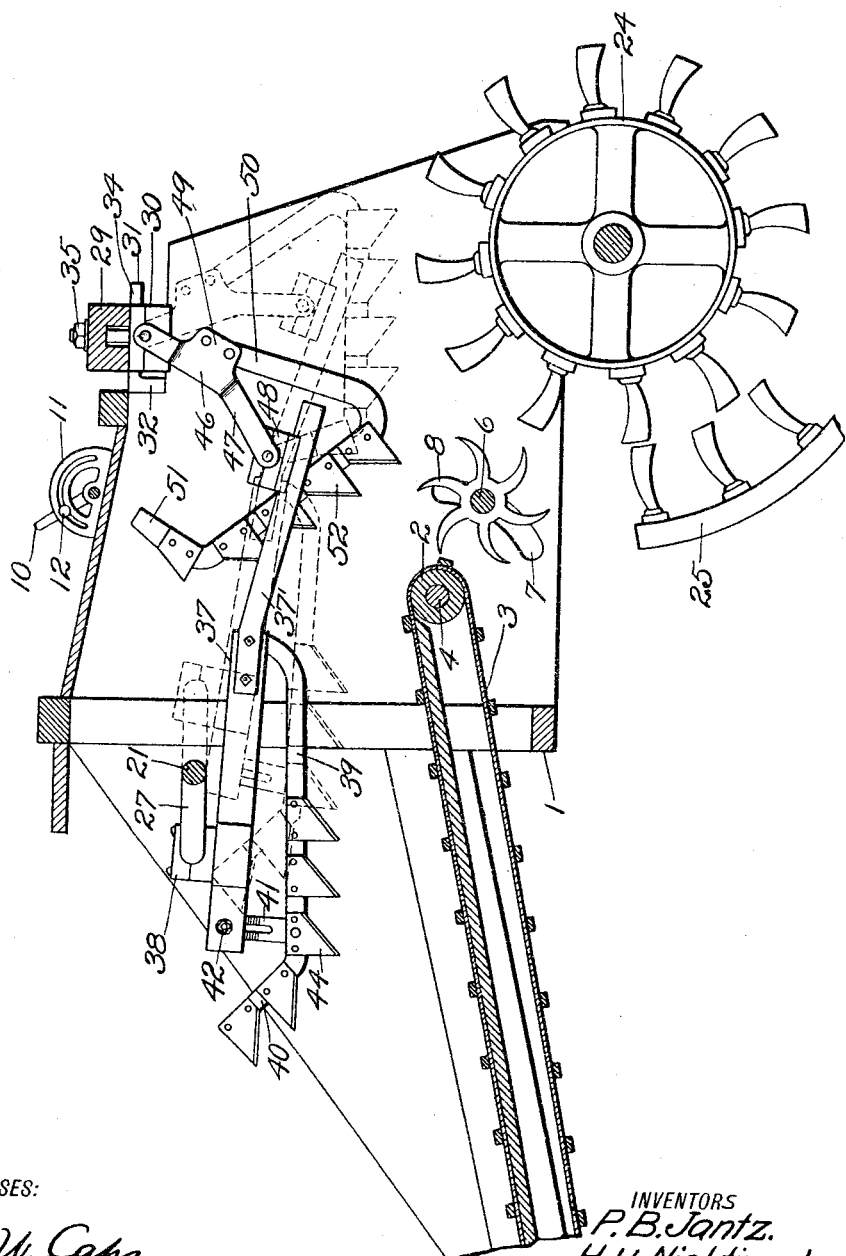

UNITED STATES PATENT OFFICE.

HENRY H. NIGHTINGALE AND PETER B. JANTZ, OF GREENSBURG, KANSAS.

BAND-CUTTER AND FEEDER.

1,181,609.

Specification of Letters Patent. Patented May 2, 1916.

Application filed May 8, 1913, Serial No. 766,353. Renewed March 13, 1916. Serial No. 83,940.

*To all whom it may concern:*

Be it known that we, HENRY H. NIGHTINGALE and PETER B. JANTZ, citizens of the United States, residing at Greensburg, in the county of Kiowa and State of Kansas, have invented certain new and useful Improvements in Band-Cutters and Feeders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to band cutters and feeders of the type ordinarily used in connection with threshing machines, and has for its principal object to provide a device of that class for cutting the bands of oncoming sheaves of grain and spreading the grain prior to its delivery to a threshing cylinder. In accomplishing this object we provide mechanism for operating on the sheaves during their travel over a conveyer, which is adapted for cutting in the direction of travel of the sheaves and is actuated by a crank device whereby the cutting knife is made to reciprocate in an elliptical path so that it is lifted over the oncoming sheaves during its backward travel and descends thereover and in contact therewith during its forward travel, together with a rear knife which is operated synchronously with the front knife and consequently has some of the elliptical movement. The rear knife is arranged to cut during its forward travel and to rake the grain from the conveyer and distribute same over the retarder and threshing cylinder, so as to produce an even distribution and thereby facilitate the threshing operation.

The cutter and feeder comprises a series or plurality of double knives, of the type mentioned, all of which are mounted on and adapted for operation from a single crank shaft, the arms of which are arranged at angles to each other so that none of the knives operate parallel to each other, although they all operate in parallel planes, thereby providing a mechanism whereby complete severing of the sheave bands and distribution of the grain is effected.

The mechanism also comprises means for adjusting the retarder to vary the throat of the feeder and thereby adapt same for proper operation on stalk or headed grain or on dry or matted or damp grain.

In accomplishing the above noted objects we have provided improved details of structure, the preferred form of which is illustrated in the accompanying drawings, wherein:—

Figure I is a longitudinal vertical section of a band cutter and feeder constructed according to our invention, showing one of the duplex knives. Fig. II is a side view of the feeder, showing the driving gear for the conveyer and retarder, and the mechanism for adjusting the retarder. Fig. III is a view of the opposite side of the feeder. Fig. IV is an end perspective showing a plurality of the duplex knives and the adjusting mechanism for the rear knife beam. Figs. V to VIII inclusive show one of the knives in its various cutting positions.

Referring more in detail to the parts, 1 designates a feeder casing which may be mounted on a threshing machine of any ordinary type (not shown) and carries a roller 2 over which the inner end of a belt conveyer 3 is adapted for travel.

Pivotally mounted on the shaft 4 which carries the inner end of the conveyer roller 2 are arms 5, the free ends of which carry a shaft 6, that extends through arcuatile slots 7 in the sides of the frame and carries a retarder 8 which extends transversely through the frame 1.

Pivotally connected with each of the arms 5 is a link 9, the upper end of which is in turn pivotally connected with a bell crank lever 10 that is journaled in a quadrant 11 on the top of the frame, and is adapted for locking engagement with the quadrant through the medium of a clamp 12, so that the retarder shaft may be raised or lowered to vary the width of the throat through which grain is delivered from the conveyer to the threshing cylinder.

On one end of the retarder shaft is a sprocket wheel 13 which is operatively connected with a sprocket wheel 14 on the conveyer shaft 4 by a belt 15 so that the retarder is driven positively from the conveyer shaft, and on the opposite end of the conveyer shaft is a gear wheel 16 which meshes with a pinion 17 on an idle shaft 18 that is journaled in the side of the frame 1.

The idle shaft 18 carries a sprocket wheel 19 which is operatively connected with a wheel 20 on crank shaft 21 that is journaled in the upper portion of the frame above the inner end of the conveyer, and is in turn driven from a belt wheel 22 so that when the crank shaft is in operation the conveyer and retarder operate synchronously therewith.

The feeder is, as above stated, adapted for use with a threshing machine, the cylinder 24 and concave 25 of which are shown in order to illustrate their relation to the cutter and feeder, although the details of construction of such parts are not claimed as part of the present invention.

The part of crank shaft 21 between the sides of the frame is provided with a plurality of crank members 27 which are extended radially from the axial line in different directions so that no two of the knives which are mounted on the crank will operate parallel with each other.

Extending transversely across the rear of the feeder is a beam 29 having blocks 30 on its under face corresponding in number and alinement with the crank members 27 on the shaft 21, the beam 29 being adapted for both vertical and longitudinal adjustment on the feeder frame by reason of its mounting on the brackets 31, each of which comprises a slotted standard 32 which is connected with the frame by bolts 33 and may be raised or lowered to adjust the cutter knives to the condition of grain fed to the thresher.

Each of the standards 32 has a transverse upper arm 34 upon which the beam 29 rests, and to which said beam is secured by the bolts 35 so that the beam may be moved forwardly or back on the supporting arms to adjust the cutter bars longitudinally to compensate for wear of the bearings, in order to maintain a rigid mounting of the knives.

Each knife comprises a frame 37, the forward end of which carries a bearing 38 within which one of the crank members 27 is revolubly mounted, and the rear end of which is extended downwardly at an angle toward the threshing cylinder.

Pivotally mounted about the center of the frame 31, and extending forwardly beneath the frame, is a bar 39 having an upturned forward end 40 and having a slotted hanger 41 adjustably connected with the forward end of the knife frame by a bolt 42 so that the forward end of the knife may be raised or lowered to bring the cutting blades into closer or more remote relation to the conveyer.

The blades 44 which are fixed on the forward end of the bar 39 and on the upturned extension 40 preferably comprise ordinary mower sickle sections and have their cutting edges directed backwardly toward the threshing cylinder, so that they will cut during the backward travel of the bar 39 and assist in raking the grain inwardly toward the retarder simultaneously with the cutting action.

The rear knife member comprises a hanger 46 which is pivotally supported from one of the blocks 30 on the cross beam 29 and has a forwardly directed arm 47 provided with a bearing block 48 which is rigidly connected with the rear end of the knife frame extension 37'.

Rigidly fixed to an ear 49 on the rear of the hanger 46 is a cutter bar 50 which extends below and at the end of the extension 37', and is turned upwardly at its free end so as to extend between the arms of said extension, the tip of said cutter bar being turned upwardly at an angle to the body of the bar to form a stop 51, of such length that when the cutter bar is at its upward and downward limit the tip 51 will remain between the members of the bar extension to prevent straw from entering and clogging the extension and thereby interfere with the proper operation of the cutter bar.

The bar 50 is provided with blades 52 preferably consisting of ordinary mower sickle sections but arranged with their cutting faces directed forwardly so that the rear knife member will cut during the forward travel of the knife and thereby insure the severing of bands which might pass uncut through the upper knife parts, the sections also serving to spread the sheaves as the latter pass over the inner end of the conveyer and over the retarder. The upturned end of the cutter bar is also provided with one of the sickle sections so that it both cuts and spreads the grain during the travel of the knife.

As before stated, the band cutter comprises any number of knife sets which are arranged on the crank shaft so that they will act in different planes, although all of the planes of operation of both the forward and rear knife members are parallel.

In using the device, presuming the parts to be constructed and assembled as described, when the crank shaft 21 is operated by means of the belt wheel 22 from a suitable driver (not shown), the crank shaft is revolved and actuates the conveyer and retarder through the gearing heretofore described, so that sheaves of grain may be carried by the conveyer to pass below the forward knife members and on from the conveyer between the retarder and the rear knife members in order to enter the cylinder. While the conveyer and retarder are operating, the crank actuates the series of knives, so that the upper knife members oscillate in elliptical paths over the inner end of the conveyer, the downward movement, or the movement which bring the knives closest to the conveyer, being, as the knives move backwardly, so that the knives come down on the sheaves in the same direction as the sheaves are traveling, and as the knives travel faster than the sheaves the blades are drawn through the straw and against the bands so that the latter are cut, the difference in speed of the conveyer and knives also serving to force the knives forwardly through the sheaves and spread the grain after the bands have been cut. When the forward knife members reach their rearward limit, the frames are drawn back by rearward movement of the crank, the same action, however, serving to lift the knife frames so that the backward movement of each upper knife member is in an elliptical plane above the cutting path cutting member, so that the knife during its rearward movement will be out of contact with the oncoming grain and therefore will not interfere with the feeding travel thereof. As the knife frame moves back to carry the front knife member through the cutting path just described, it moves the hanger 46 rearwardly so that the cutter bar 60 is moved back, and, owing to the shape of the bar, the body portion which carries the knife sections is brought downwardly and rearwardly until when the rear limit of travel is reached the said body member is in substantially a horizontal plane, the extension 51' however being of sufficient length to retain its position between the frame members 37' so as to bar the admission of straw between the frame members.

It is apparent that while the rear knife member is being moved downwardly and rearwardly, the knife sections engage the straw which has been forwarded over the rear end of the conveyer and rake said straw over the retarder and into the threshing cylinder, spreading the grain laterally during such raking actuation. It is also apparent that although the cutting edges of the knife sections are directed forwardly, the downward and rearward movement of the knife member would bring the cutting edges into contact with uncut bands, so that any bands which might pass through the front of the knife without being cut would be severed by the rear knives. After the knife has passed to its rear limit and starts forwardly the rear knife member returns to its upper position through the same path by which it reached its outward limit, so that the knife blades are now brought directly into contact with the grain and will serve to positively cut any previously unsevered bands and at the same time serve to spread the grain by passing forwardly therethrough.

It is apparent that by providing a plurality of the knife sets and arranging each set so that it will travel in an independent path there will be a constant cutting and spreading action of the knives on the oncoming grain and at no time will any grain be allowed to pass into the cylinder without having been engaged by both forward and rear knife members.

It is apparent that by means of the retarder the throat of the feeder may be made larger or smaller to accommodate grain of different conditions, so that a perfect cutting and feeding operation may be had at all times.

Having thus described our invention, what we claim as new therein, and desire to secure by Letters-Patent, is:—

1. In a band cutter and feeder, an inclosing casing, a crank shaft in said casing, a knife frame journaled on said crank shaft, having an extension, and a cutter pivotally mounted on said casing and on the extension of said knife frame and adapted for movement above and below said knife frame extension.

2. In a band cutter and feeder, an inclosing casing, a crank shaft revolubly mounted in said casing, a knife frame journaled on said crank shaft having a slotted extension, and a cutter pivotally mounted on said casing and extension and adapted for movement within said slot.

3. In a band cutter and feeder, an inclosing casing, a crank shaft revolubly mounted in said casing, a knife frame journaled on said crank shaft having rearwardly extending, spaced arms, and a cutter pivotally mounted on said casing and knife frame arms and adapted for movement between said spaced arms.

4. In a band cutter and feeder, an inclosing casing, a crank shaft revolubly mounted in said casing, a knife frame journaled on said crank shaft, having a slotted extension, a hanger pivotally mounted on said casing and knife frame extension and a cutter rigidly secured to said hanger and adapted for movement within the slotted portion of the knife frame extension.

5. In a band cutter and feeder, an inclosing casing, a crank shaft revolubly mounted in said casing, a knife frame journaled on said crank shaft, rearwardly extending, spaced arms on said knife frame, a hanger pivotally mounted on said casing and arms, a V-shaped cutter bar having one leg rigidly connected to said hanger and the free leg projected between said arms, cutters on the free leg of said cutter bar, and means for actuating said crank shaft to oscillate said hanger and move the free leg of said cutter bar above and below said knife frame arms.

In testimony whereof we affix our signatures in presence of two witnesses.

HENRY H. NIGHTINGALE.
PETER B. JANTZ.

Witnesses:
MARGARET KANE,
J. R. JOHNSON.

Copies of this patent may be obtained for five cents each, by addressing the "Commissioner of Patents, Washington, D. C."